United States Patent
Zhou (10) Patent No.: US 10,821,955 B2
(45) Date of Patent: Nov. 3, 2020

(54) RAILWAY CAR BRAKE LOCK

(71) Applicant: Zhicong Zhou, Los Angeles, CA (US)

(72) Inventor: Zhicong Zhou, Los Angeles, CA (US)

( * ) Notice: Subject to any disclaimer, the term of this patent is extended or adjusted under 35 U.S.C. 154(b) by 255 days.

(21) Appl. No.: 16/180,489

(22) Filed: Nov. 5, 2018

(65) Prior Publication Data

US 2020/0070799 A1    Mar. 5, 2020

Related U.S. Application Data

(63) Continuation of application No. 16/122,168, filed on Sep. 5, 2018, now Pat. No. 10,604,135.

(51) Int. Cl.

| | |
|---|---|
| *B60T 17/16* | (2006.01) |
| *B60T 13/26* | (2006.01) |
| *B60T 7/08* | (2006.01) |
| *B60T 17/18* | (2006.01) |
| *B61H 13/02* | (2006.01) |
| *B61H 13/34* | (2006.01) |
| *F16D 65/00* | (2006.01) |
| *F16D 127/06* | (2012.01) |

(52) U.S. Cl.
CPC ............. *B60T 17/16* (2013.01); *B60T 7/08* (2013.01); *B60T 13/26* (2013.01); *B60T 17/18* (2013.01); *B61H 13/02* (2013.01); *B61H 13/34* (2013.01); *F16D 65/00* (2013.01); *F16D 2127/06* (2013.01)

(58) Field of Classification Search
CPC . B60T 17/16; B60T 7/08; B60T 13/26; B60T 187/18; B61H 13/02; B61H 13/34; F16D 65/00; F16D 2127/06
See application file for complete search history.

(56) References Cited

U.S. PATENT DOCUMENTS

| | | | | |
|---|---|---|---|---|
| 4,420,066 A | * | 12/1983 | Bogenschutz | B60T 17/16 188/107 |
| 2005/0173206 A1 | * | 8/2005 | Reuter | F16D 65/18 188/72.7 |
| 2005/0252737 A1 | * | 11/2005 | Morris | F16D 65/183 188/106 P |
| 2016/0167684 A1 | * | 6/2016 | Gerber-Papin | F16D 55/2245 188/60 |

FOREIGN PATENT DOCUMENTS

JP        54035565 A  *  3/1979 ............ F16D 65/18

* cited by examiner

*Primary Examiner* — Melanie Torres Williams
(74) *Attorney, Agent, or Firm* — Clement Cheng (57) ABSTRACT

A railway slipping block brake lock has a brake linkage arm connector configured to connect a brake linkage arm to a draw rod. A draw rod is connected to the brake linkage arm connector. The draw rod has a draw rod engaged position corresponding to a railway brake engaged position, and the draw rod has a draw rod disengaged position corresponding to a railway brake disengaged position. A slipping block is mounted around the draw rod. The slipping block has a wedge shaped profile that fits to a wedge-shaped opening of a retaining frame. The retaining frame has a retaining frame wedge-shaped inside profile to receive the slipping block. The slipping block releases the draw rod and disengages from the retaining frame when the draw rod moves toward an engaged position.

14 Claims, 6 Drawing Sheets

RAILWAY CAR BRAKE LOCK

This application is a continuation in part and claims priority from inventor Zhicong Zhou's U.S. patent application Ser. No. 16/122,168 entitled Railway Car Brake Lock filed Sep. 5, 2018, the disclosure of which is incorporated herein by reference.

FIELD OF THE INVENTION

The present invention is in the field of railway car braking systems.

DISCUSSION OF RELATED ART

Railway car brakes have been made with air powered parking brakes. These parking brakes depend on constant air pressure. Under inconsistent air pressure, the parking brakes can loosen leading to slippage. Also, human error can lead to rollaway accidents on railways. The predominant current system is the air brake system. When the train parks on rail line and releases air from air brake pipes it needs to take other measures to prevent rolling away. Railway car rollaway can be dangerous.

SUMMARY OF THE INVENTION

A railway slipping block brake lock has a brake linkage arm connector configured to connect a brake linkage arm to a draw rod. A draw rod is connected to the brake linkage arm connector. The draw rod has a draw rod engaged position corresponding to a railway brake engaged position, and the draw rod has a draw rod disengaged position corresponding to a railway brake disengaged position. A slipping block is mounted around the draw rod. The slipping block has a wedge shaped profile that fits to a wedge-shaped opening of a retaining frame. The retaining frame has a retaining frame wedge-shaped inside profile to receive the slipping block. The slipping block releases the draw rod and disengages from the retaining frame when the draw rod moves toward an engaged position. A release poke fork is configured to poke the slipping block away from the retaining frame when the release poke fork is engaged. The release poke fork has a pair of tines that engage the slipping block. When the release poke fork is engaged, the release poke fork releases the slipping block from the retaining frame. Yet, when the release poke fork is not engaged, the slipping block lodges to the retaining frame wedge shape inside profile when the draw rod retracts toward a disengaged position.

The release poke fork is pivotally mounted and moves pivotally when actuated by a cylinder rod piston shaft. The cylinder rod piston shaft is pneumatically connected to a functional cylinder. The functional cylinder is formed as an air chamber. The cylinder rod piston shaft is connected to an air cylinder rod pressure plate so that the piston shaft moves according to the pressure in the functional cylinder. The railway car slipping block brake lock can have an air recharging valve and an air discharging valve. The air recharging valve when actuated increases air pressure in the functional cylinder, and the air discharging valve when actuated decreases air pressure in the functional cylinder. A cylinder rod piston shaft actuates the release poke fork by engaging the release poke fork at a release poke fork rounded engagement.

The railway slipping block brake lock can also have a brake pipe air source port for receiving air pressure from the brake pipe. A cylinder spring can be mounted to the cylinder rod piston shaft and bias the cylinder rod piston shaft into a disengaged position until the air recharging valve actuates and increases air pressure in the functional cylinder. The cylinder rod piston shaft is sealed to the functional cylinder by an air cylinder lamina. The air cylinder lamina is retained to a cylinder rod pressure plate of the cylinder rod piston shaft by an air cylinder lamina retainer.

The following call outs can be a useful guide in referencing the element numbers of the drawings.

A Piston Connector
B Execution Unit
C Air Pressure Control Unit
1 Brake Pipe Air Source Port
2 Functional Cylinder
6 Release Poke Fork
7 Clamp Spring
8 Slipping Block
9 Cylinder Spring
10 Cylinder Rod Piston Shaft
11 Draw Rod
12 Corrugated Cover
13 Vertical Pin Roll
14 Horizontal Pin Roll
20 Railway Car Brake Lock
21 Pressure Distribution Valve
22 Main Part Pedestal
24 Air Cylinder Lamina
28 Air Cylinder Lamina Retainer
29 Cylinder Rod Pressure Plate
31 Unidirectional Air Discharging Piston Module
32 Functional Cylinder Port
33 Unidirectional Valve
34 Air Recharging Valve
35 Pressure Distribution Valve Front Cover
36 Pressure Distribution Valve Body
37 Air Source Port Of Brake Pipe
38 Air Recharging Valve Spring
39 Pressure Distribution Valve Back Cover
40 Lamina Retaining Plate
41 Lamina
42 Air Discharging Lamina Installation Seat
43 Air Discharging Valve Pressure Spring
44 Air Discharging Valve
61 Cut-Out Cock
62 Combination Dire Collector
63 Brake Cylinder
64 Auxiliary Reservoir
65 Train Brake Pipe
66 Accelerated Release Reservoir
67 Air Control Valve
68 Brake Linkage Arms 71 Main Part End Cover
72 Cylinder Wall
73 Lamina Cutout
74 Middle Body
75 Friction Plate Wedge Block Cut Out
77 Release Poke Fork Pivot
78 Release Poke Fork Rounded Engagement
79 Bush
80 Roller
81 Retaining Frame
82 Wedge-Shaped Opening Of Retaining Frame
83 Wedge-Shaped Inside Profile Of Retaining Frame
86 Washer

DETAILED DESCRIPTION OF THE PREFERRED EMBODIMENT

Figure 6:
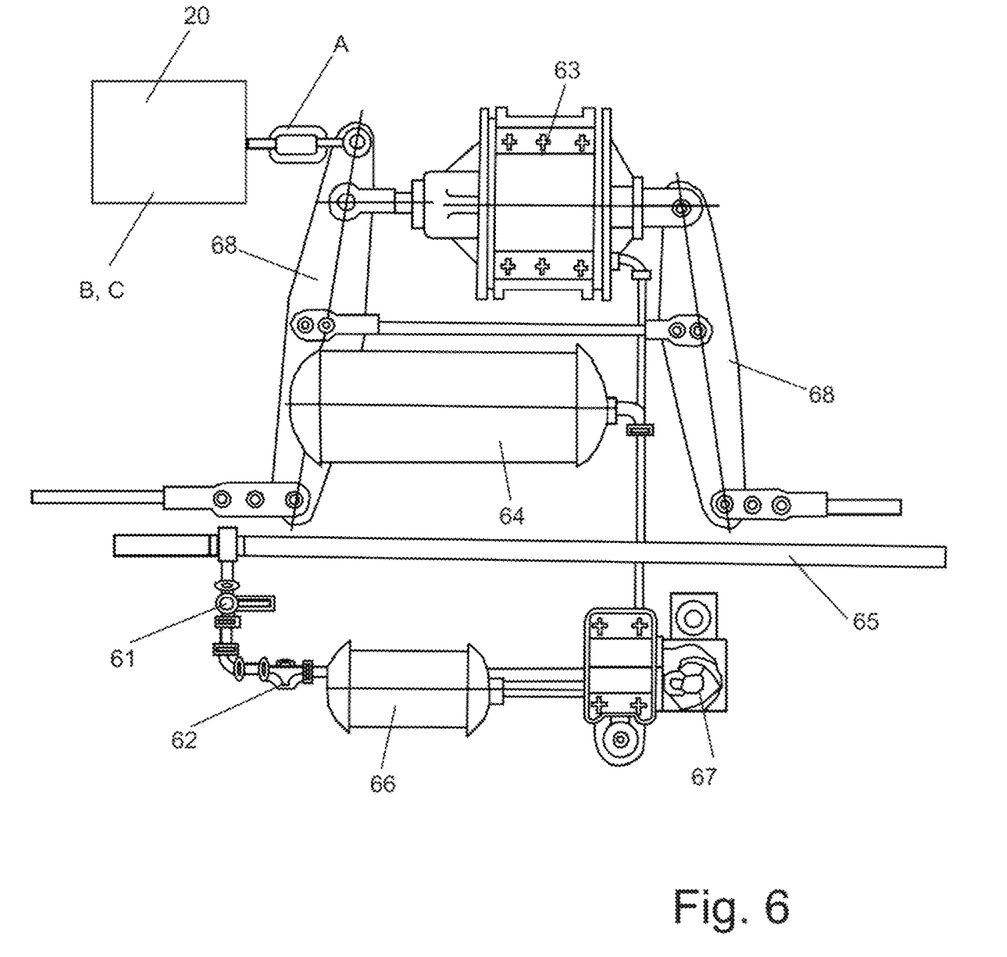
FIG. 6 is a system diagram showing where the device is installed on a railway car brake system.
Figure 7:
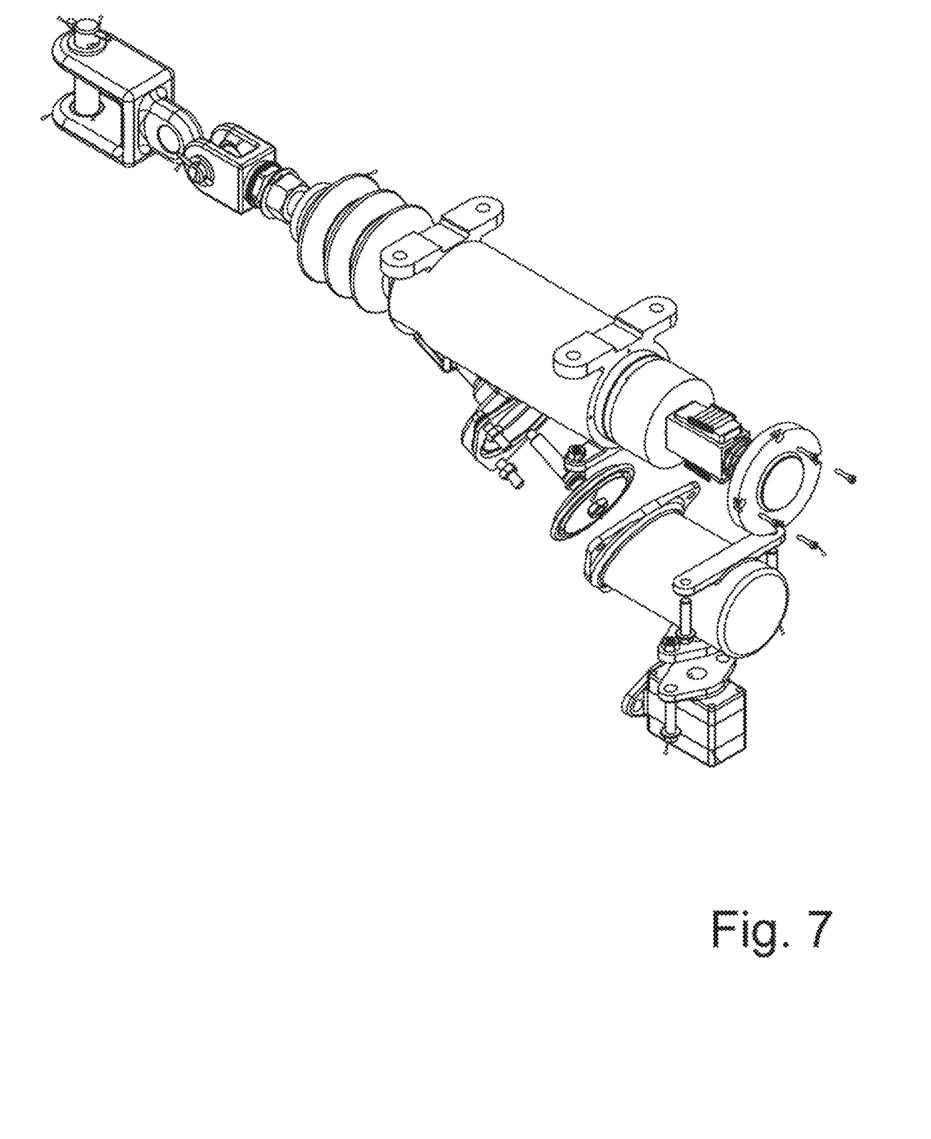
FIG. 7 is an exploded view diagram of the present invention showing assembly of the railway car slipping block brake.

The brakes are operated by the train brake pipe and the present invention is a backup safety brake for the standard train breaking system. The present invention is a railway car brake lock 20 that locks the brakes to prevent them from slipping. The present invention provides a method of retrofitting a railway car so that the railway a car brake does not loosen up during long idle periods or if the railway car is disconnected from the locomotive steam or air pressure supply during operation. The present invention can be mounted to a supporting rail of the railway car such as by bolting or welding. The general placement of the railway car brake lock 20 is shown in FIG. 6. The railway car brake lock 20 can be connected to any of the brake linkage arms 68. When a train brake pipe decreases pressure the brake operates. When train brake pipe increases pressure, the brake releases. When locomotive separates from railcars or an emergency valve has been activated, the train can brake to stop automatically. When air pressure inside a train brake pipe decreases, the air brake equipment produces force that passes to basic brake device so that the device finally contacts brake shoes to hold the wheels which stops the train. After a train parks, the compressed air inside brake cylinder passes the pressure force to basic brake device through a piston. The basic brake device has a piston, brake shoes and levers. The basic brake device enlarges pressure force from compressed air inside the brake cylinder and passes it to brake shoes that press on wheels to keep railcars stopped. In this system, the system is powered by a train brake pipe 65 which draws air pressure from the locomotive. A cut-out cock 61 provides an air valve for activating the brake release mechanism. A combination dire collector 62 controls pressure to a accelerated release reservoir 66 which is a tank of pressurized fluid such as air. The train has a brake cylinder 63 which is connected to links which connect to brake pads. The air control valve 67 then controls pressure to a larger tank of air which is the auxiliary reservoir 64. The air control valve 67 also passes air to the brake cylinder 63 which actuates the brake linkage arms 68. The brake linkage arms 68 have a pivoting relationship to each other and are secured and mounted to the railway car frame. The railway car frame is typically formed as a truck.

Figure 1:
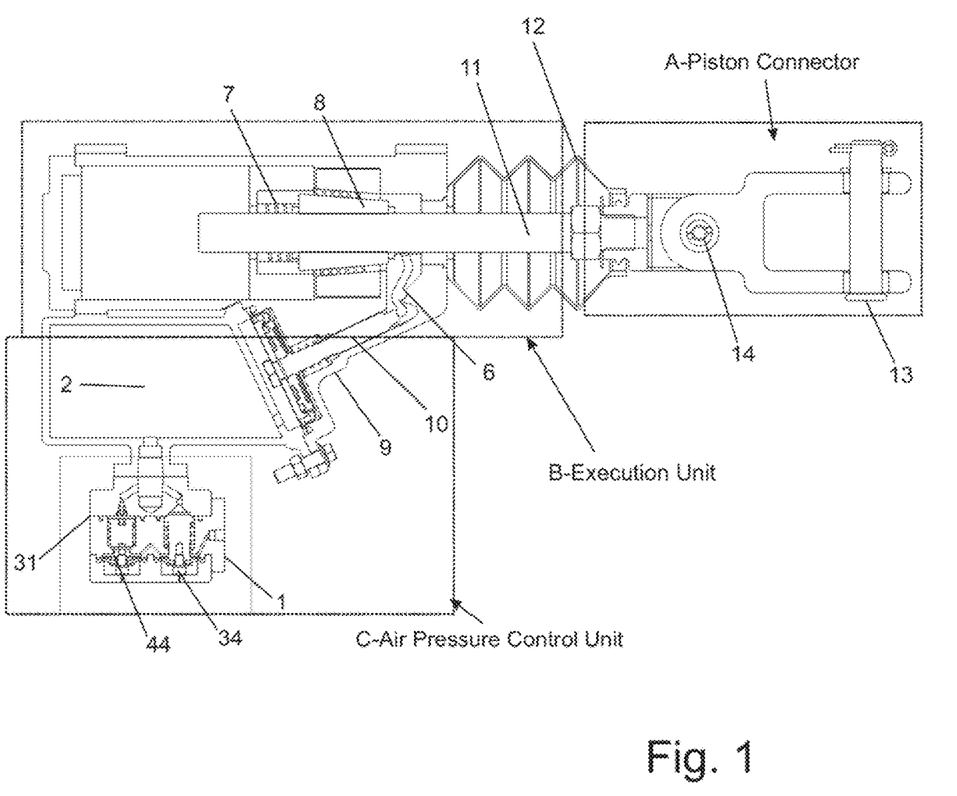
FIG. 1 is a cross-section diagram of the present invention.

FIG. 1 is a cross-section diagram of the operation of the railway car ratcheting brake. As seen in the cross-section diagram, the process begins with air source brake pipe 1. Air, and air pressure as used herein can refer to steam, or air with high moisture, or dry air. The air source brake pipe 1 can be pressurized by the locomotive for example. The functional cylinder 2 is a cylindrical hollow that has a piston connected to a piston shaft. The piston shaft 10 moves when the air recharging valve 34 is activated or deactivated and the air discharging valve 4 is activated or deactivated. The air recharging valve 34 adds air to the functional cylinder 2 and the air discharging valve 4 removes air from the functional cylinder 2. Because a cylinder spring 9 opposes the piston and biases it against the pressurized air in functional cylinder 2, the pair of air valves provides control over the lateral movement of the piston shaft 10. The air passage after the air discharging valve 4 has a unidirectional valve 5 so that air does not charge through the air discharging valve 4.

The motion of the cylinder rod 10 biases a lever that releases a slipping block 8 from a draw rod 11. When the draw rod 11 can move, the railway car ratcheting brake can be released. The draw rod 11 is locked into a lock position when the clamp spring 7 biases the slipping block 8 clamp on to the draw rod 11. The lever when actuated, picks away the slipping block 8 from the draw rod 11. The lever biases against the clamp spring 7 to overcome the spring bias of the clamp spring 7 when the lever is actuated by the motion of the piston shaft 10.

The clamping portion of the device is the feature of the invention. The slipping block 8 is angled to a conical shape so that it fits inside a conical hollow portion of a die so that the sideways motion of the slipping block translates into compressive motion to grip the draw rod 11. The slipping block has a micro ratcheting configuration where it allows even a very slight slippage of the draw rod 11 in a tightening direction, but then automatically grabs on when motion of the draw rod 11 is in the other direction. When the slipping block has tightened to the maximum extent possible, the draw rod 11 can be released by the lever.

Figures 3, 4:
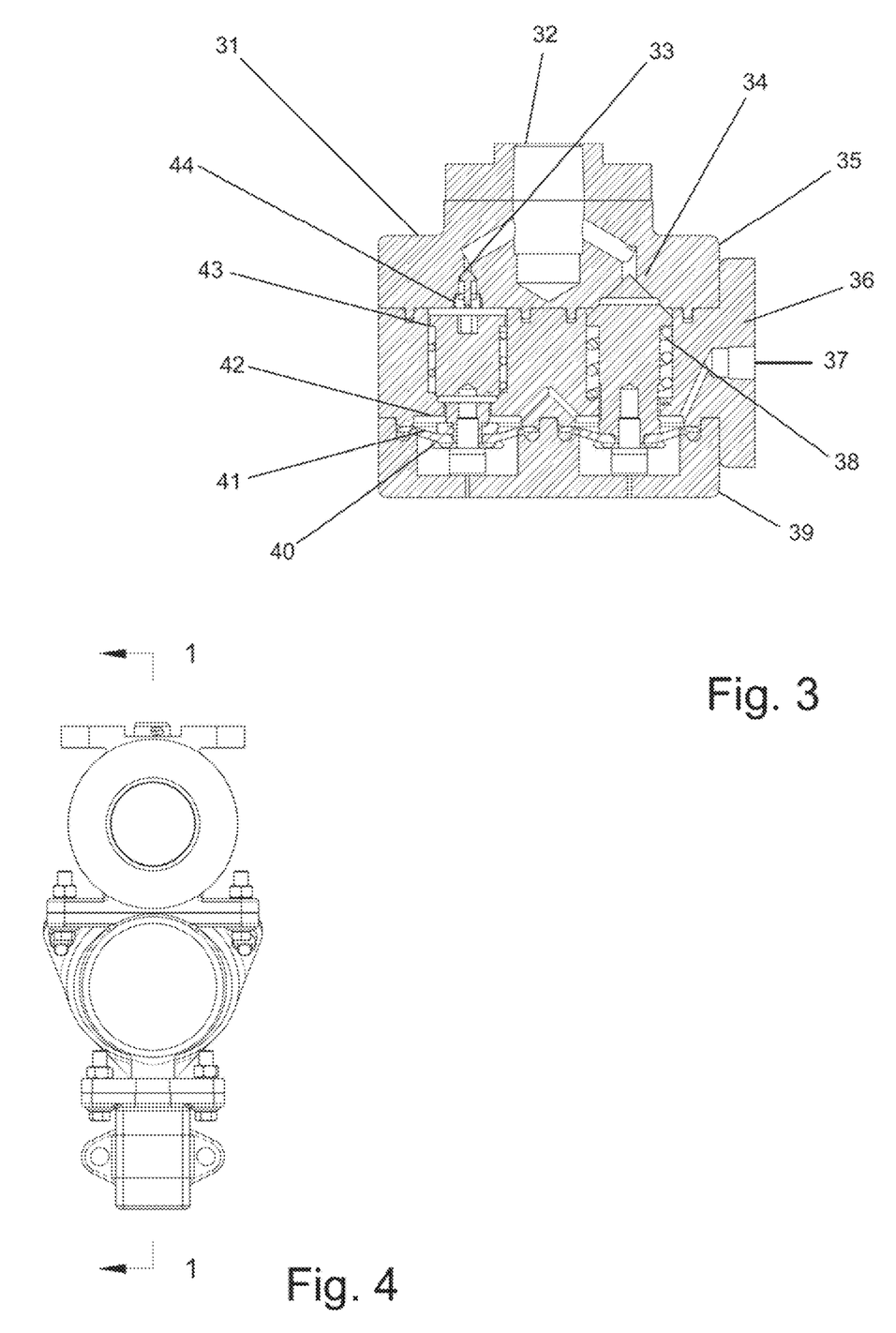
FIG. 3 is a cross-section diagram of the pressure distribution valve showing details.
FIG. 4 shows the line where the cross-section is taken in FIG. 1.

As seen in FIG. 3, the pressure distribution valve has some preferred details including a unidirectional air discharging piston module 31. The functional cylinder port 32 passes pressure to the functional cylinder 2, but is ultimately receiving air pressure from an air pressure source such air source brake pipe 1 through the valves. The unidirectional valve 33 discharges air in one direction only which maintains the airflow direction. The air recharging valve 34 charges the functional cylinder 2. The air source port of brake pipe 37 is fed by the air source brake pipe 1. The pressure distribution valve front cover 35 fits over the pressure distribution valve body 36 and can be bolted to the pressure distribution valve body 36. In this way, the internal portions of the passages can be machined and then the unidirectional air discharging piston module 31 can be assembled from separate pieces of metal blocks. Additionally, the pressure distribution valve back cover 39 is another block of metal that is machined and then preferably bolted to the pressure distribution valve body 36 such that the pressure of distribution valve body 36 is sandwiched between the pressure distribution valve front cover 35 and the pressure distribution valve back cover 39.

The valves have springs biasing the valves into a particular position, preferably into a closed position. For example, the air recharging valve 34 has an air recharging valve spring 38. The lamina 41 is retained by a lamina retaining plate 40. The air discharging lamina has an air discharging lamina installation seat 42 so that the air discharging lamina can seat against the air discharging lamina installation seat 42. Similarly, the air discharging valve 44 has an air discharging valve pressure spring 43.

As seen in FIG. 1, the anti-roll away device could also be called a railway car ratcheting brake or a railway car slipping block brake has three. The main parts of the present invention are an air pressure control unit C, an execution unit B and a piston connector A which are in dotted line boxes to show the general configuration of the device. The antirollaway device is triggered by a signal and then pressurized by air pressure in the train brake pipe so that it automatically brakes or releases the railcar.

The piston connector A includes a vertical pin roll 13 and a horizontal pin roll 14 provides a gimbaled connection to the brake. The execution unit B includes a corrugated cover 12 that covers the draw rod 11. The draw rod 11 is connected to the piston connector A. The gimbaled connection is important because the retrofit system can be adapted to a variety of different railway car makes and models and provides leeway when the railway car brake rod is not exactly aligned to the draw rod 11. The corrugated cover 12 protects the draw rod 11 from external dust and water.

The execution unit B additionally includes the clamp spring 7 that biases the slipping block 8 into an engaged position from an disengaged position. In the engaged position, the slipping block 8 grasps the draw rod 11, and in the disengaged position, the slipping block releases from the draw rod 11 while slipping along the draw rod 11. The release member releases the slipping block 8 from the draw rod 11. The release member can be formed as a lever in a shape such as the release poke fork 6. The release poke fork 6 is lever shaped and has a pair of tines that extend to a left and right side of the draw rod 11 so that the pair of tines poke away or pick away the slipping block 8 from the slipping block engaged position. The slipping block 8 is formed as an annular collar that fits around the draw rod 11. The slipping block can be segmented and made of metal parts such as in a pair of parts, namely a left part and a right part. If made as a right part and a left part, the slipping block 8 can rely on the release poke fork 6 to have a pair of tines that poke away the right part in the left part so as to release the slipping block 8 from the draw rod 11. The slipping block 8 is more generically termed a lever which more generically termed a release member.

The pressure control unit C has a brake pipe air source port 1 supplying air to the pressure control unit C. The brake pipe air source port 1 ultimately fills up the functional cylinder 2 which pushes the cylinder rod piston shaft 10 against the cylinder spring 9 so that the cylinder rod piston shaft 10 actuates the release poke fork 6. The functional cylinder 2 of the air pressure control unit has a port for receiving the unidirectional air discharging piston module so that air pressure can be added and bled away from the functional cylinder 2. The air discharging valve 44 releases air pressure from the functional cylinder 2 and the air recharging valve 34 adds air pressure to the functional cylinder 2.

The brake pipe air source port 1 connects to the train brake pipe and supplies air to the air recharging valve and air discharging valve. The cylinder rod piston shaft 10 releases the draw rod 11 with a release poke fork 6 to release the draw rod 11. When the draw rod 11 is clamped by the slipping block 8, the slipping block 8 allows the draw rod to tighten the brakes, but does not allow the draw rod to release the brakes.

Optionally, the draw rod 11 can have a textured surface so that it has an external surface that is not smooth and the slipping block 8 can have a textured surface that is not smooth so that the textured surface of the slipping block 8 can interface with the textured surface of the draw rod 11 to allow a micro ratcheting feature. For example, grooves or protrusions can be formed on the slipping block or draw rod so that the gripping qualities between the surfaces can be modified.

The spring constants of the springs installed affect the pressure at which the cylinder rod 10 moves to the release position. The force can be adjusted by adjusting a bolt that changes the compression of the springs installed. The minimum value of air pressure to allow release can be adjustable.

Figure 2:
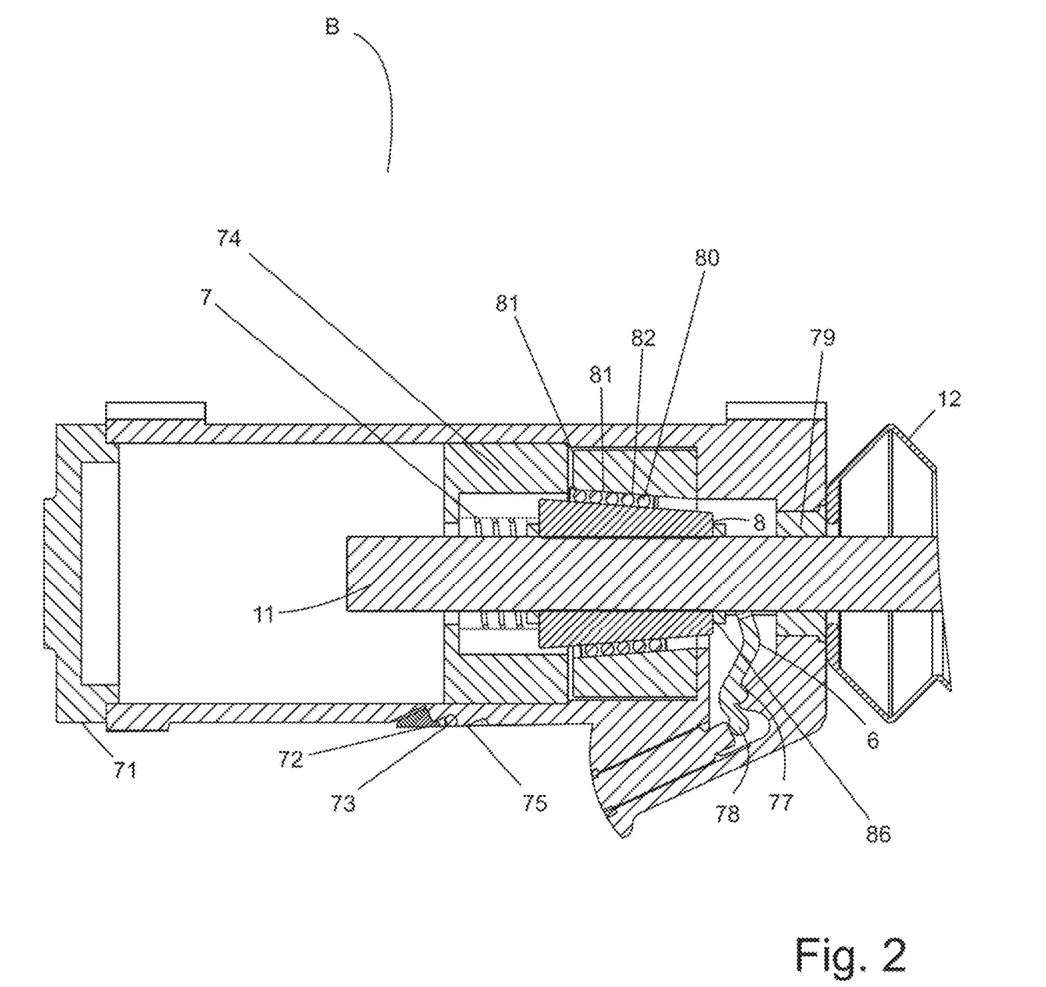
FIG. 2 is a cross-section diagram of the execution unit.

As seen in FIG. 2, the execution unit B is the key part of the invention that allows the selective gripping of the draw rod 11. The execution unit B has a main part end cover 71 that can be threadedly connected. The cylinder wall 72 defines a hollow cylinder, but one that is not necessarily pressurized like the functional cylinder 2. The draw rod 11 has a middle body 74 attached to it to maintain good alignment with the cylinder wall 72. To conserve space, the cylinder wall can have cutouts for mounting the lamina 41, such as a laminate cutout 73. Also, the friction plate wedge block cut out can be formed into the cylinder wall 72.

The release poke fork 6 has a release poke fork pivot 77 so that the release poke fork 6 pivots on the release poke fork pivot 77 like a lever. The release poke fork pivot could be formed by a pivot protrusion formed on the release poke fork 6 that engages to a release poke fork depression shaped to receive the pivot protrusion while allowing rotation. The release poke fork 6 also has a release poke fork rounded engagement 78 which has a rounded contact with the cylinder rod piston shaft. The cylinder rod piston shaft 10 engages the rounded contact. A bush 79 aligns the right side of the draw rod 11.

The retaining frame 81 can retain a roller 80 so that the retaining frame 81 does not bind against the slipping block 8. The roller retaining frame 81 has a conical opening for receiving the conical shape of the slipping block 8. The 82 Retaining Frame Wedge-Shaped Opening 82 is formed on the retaining frame to provide a conical shaped opening having a retaining frame wedge-shaped inside profile 83 that receives the conical shaped slipping block 8. The interface is preferably an inverted frustro conical profile.

The clamp spring 7 is preferably installed between the slipping block 8 and a hollow portion of the middle body 74. If the slipping block 8 is formed as an frustro conical shape, then the base of the slipping block can receive the helical clamp spring 7. The draw rod 11 can have a draw rod tip. The slipping block 8 can abut against a washer 86 so that the tines of the release poke fork 6 press against the washer 86 and the washer presses against the slipping block 8. The washer 86 is optional.

Figure 5:
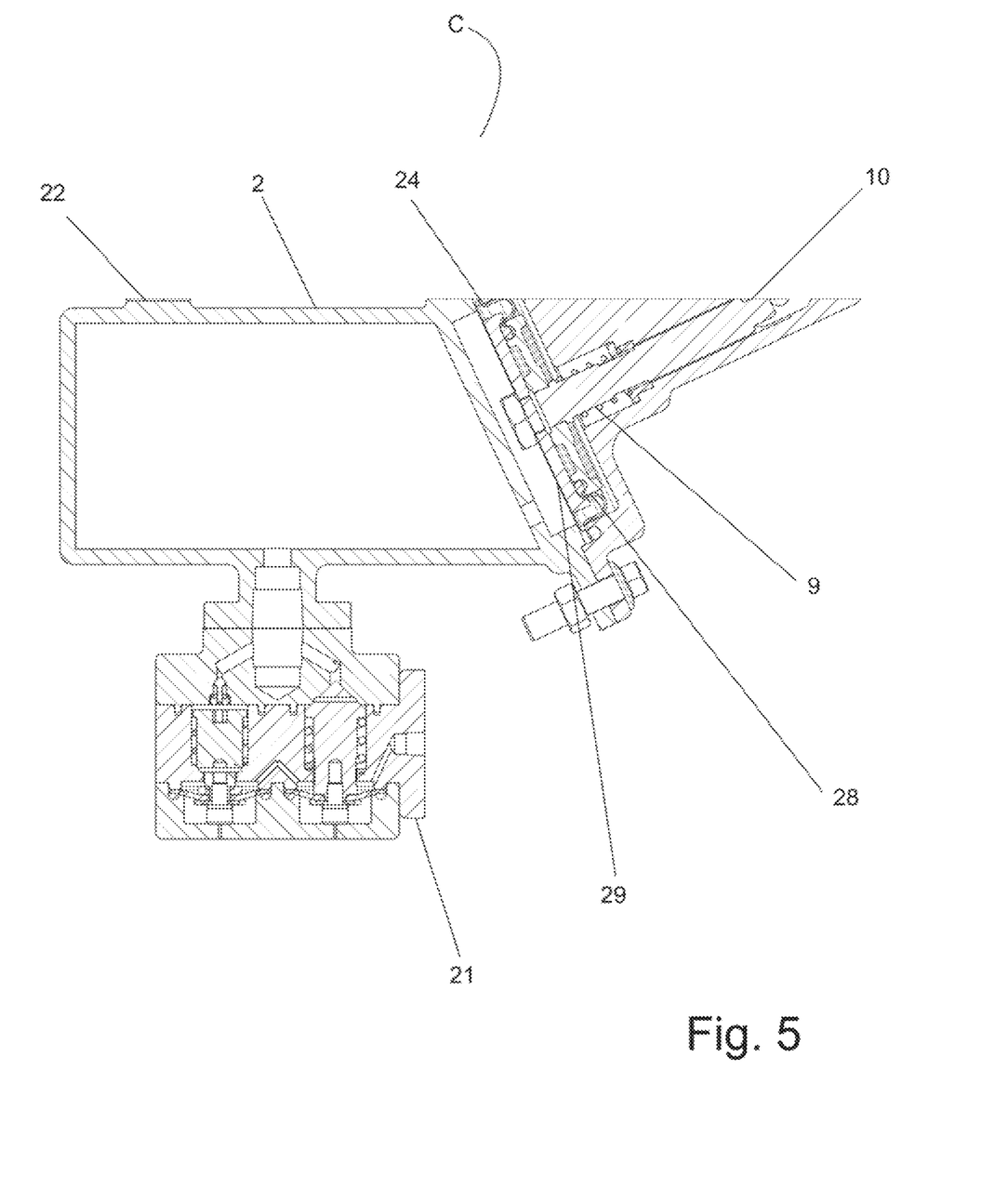
FIG. 5 is a cross-section diagram of the air pressure control unit.

Additional details regarding the air pressure control unit are shown on FIG. 5. The pressure distribution valve 21 and includes the unidirectional air discharging piston module 31. The main part pedestal 22 is a mounting area for the air pressure control unit. The air cylinder lamina 24 maintains a seal so that air pressure in the functional cylinder 2 can actuate the cylinder rod 10. The cylinder rod 10 is biased in a released position by the cylinder spring 9. The air cylinder lamina 24 maintains an airtight seal between the edge of the air cylinder and the cylinder rod pressure plate 29. The air cylinder lamina 24 is retained by an air cylinder lamina retainer 28 in an airtight configuration.

The operation of the device is as follows:

When the slipping block 8 is in a braked position, the draw rod 11 can still move toward the clamp spring 7 and tighten up the railway car brake. Thus, during an emergency brake, the air pressure in the train brake pipe could drop to ambient air pressure after some short time. The slipping block 8 can move to the brake position before the draw rod 11 retracts. Thus, the system is designed to be a failsafe system where the failure mode defaults to a braked position. This allows retention of the draw rod 11 when the draw rod moves to the left as seen in FIG. 1, so that any tightening of the brake is not given up when systemwide air pressure is lost.

The draw rod 11 connects to the front rod of the brake cylinder. When a train brakes or releases normally, air pressure in the train brake pipe is between 470 KPa and 600 KPa. during normal operation, air pressure in functional cylinder 2 is not lower than 470 KPa, and so the draw rod 11 can travel freely. The train can brake or release freely. Only when it is necessary to prevent a train or railcars from rolling away, and there is no air pressure in train brake pipe, does the device go into braking status. After a train stops, if it needs to prevent a rolling away because of a long-term parking, air in the train brake pipe is emptied and the pressure becomes lower than the set value air pressure. Then, air escapes functional cylinder 2 so that the cylinder spring 9 pushes the cylinder rod piston shaft 10 to a brake position. The clamp spring 7 pushes the slipping block 8 to clamp and arrest the draw rod 11. When the draw rod 11 is arrested, the draw rod is not allowed to retract so that the brakes do not loosen. The draw rod 11 is mechanically connected to the braking system. This prevents the train or railcar from rolling away. Even if the air in the brake cylinder continuously leaks, the train or railcars could still keep the same braking force.

When a train releases from anti-rolling away status, locomotive putts air into train brake pipe. After air pressure in train brake pipe goes higher than set value, air goes into the functional cylinder 2. The pressure in the functional cylinder 2 actuate the cylinder rod piston shaft 10 to move to a release position. The draw rod can now travel freely which releases the brake lock and thus allows the train to release the brakes.

The invention claimed is:

1. A railway slipping block brake lock comprising:
   a. a brake linkage arm connector configured to connect a brake linkage arm to a draw rod;
   b. a draw rod connected to the brake linkage arm connector, wherein the draw rod has a draw rod engaged position corresponding to a railway brake engaged position, and wherein the draw rod has a draw rod disengaged position corresponding to a railway brake disengaged position;
   c. a slipping block mounted around the draw rod, wherein the slipping block has a wedge shaped profile that fits to a wedge-shaped opening of a retaining frame, wherein the retaining frame has a retaining frame wedge-shaped inside profile to receive the slipping block, wherein the slipping block releases the draw rod and disengages from the retaining frame when the draw rod moves toward an engaged position;
   d. a release poke fork configured to poke the slipping block away from the retaining frame when the release poke fork is engaged, wherein the release poke fork has a pair of tines that engage the slipping block, wherein when the release poke fork is engaged the release poke fork releases the slipping block from the retaining frame, wherein when the release poke fork is not engaged the slipping block lodges to the retaining frame wedge shape inside profile when the draw rod retracts toward a disengaged position.

2. The railway car slipping block brake lock of claim 1, wherein the release poke fork is pivotally mounted and moves pivotally when actuated by a cylinder rod piston shaft, wherein the cylinder rod piston shaft is pneumatically connected to a functional cylinder, wherein the functional cylinder is formed as an air chamber, wherein the cylinder rod piston shaft is connected to an air cylinder rod pressure plate so that the piston shaft moves according to the pressure in the functional cylinder.

3. The railway car slipping block brake lock of claim 1, further including an air recharging valve and an air discharging valve, wherein the air recharging valve when actuated increases air pressure in the functional cylinder, and wherein the air discharging valve when actuated decreases air pressure in the functional cylinder.

4. The railway car slipping block brake lock of claim 1, wherein a cylinder rod piston shaft actuates the release poke fork by engaging the release poke fork at a release poke fork rounded engagement.

5. The railway car slipping block brake lock of claim 1, further including a brake pipe air source port for receiving air pressure from the brake pipe, wherein a cylinder spring mounted to the cylinder rod piston shaft biases the cylinder rod piston shaft into a disengaged position until the air recharging valve actuates and increases air pressure in the functional cylinder.

6. The railway car slipping block brake lock of claim 5, wherein the cylinder rod piston shaft is sealed to the functional cylinder by an air cylinder lamina, wherein the air cylinder lamina is retained to a cylinder rod pressure plate of the cylinder rod piston shaft by an air cylinder lamina retainer.

7. A railway slipping block brake lock comprising:
   a. a brake linkage arm connector configured to connect a brake linkage arm to a draw rod;
   b. a draw rod connected to the brake linkage arm connector, wherein the draw rod has a draw rod engaged position corresponding to a railway brake engaged position, and wherein the draw rod has a draw rod disengaged position corresponding to a railway brake disengaged position;
   c. a slipping block mounted around the draw rod, wherein the slipping block has a wedge shaped profile that fits to a wedge-shaped opening of a retaining frame, wherein the retaining frame has a retaining frame wedge-shaped inside profile to receive the slipping block, wherein the slipping block releases the draw rod and disengages from the retaining frame when the draw rod moves toward an engaged position;
   d. a release poke fork configured to poke the slipping block away from the retaining frame when the release poke fork is engaged, wherein the release poke fork has a pair of tines that engage the slipping block, wherein when the release poke fork is engaged the release poke fork releases the slipping block from the retaining frame, wherein when the release poke fork is not engaged the slipping block lodges to the retaining frame wedge shape inside profile when the draw rod retracts toward a disengaged position, wherein the release poke fork is pivotally mounted and moves pivotally when actuated by a cylinder rod piston shaft.

8. The railway car slipping block brake lock of claim 7, further including an air recharging valve and an air discharging valve, wherein the air recharging valve when actuated increases air pressure in the functional cylinder, and wherein the air discharging valve when actuated decreases air pressure in the functional cylinder.

9. The railway car slipping block brake lock of claim 7, wherein a cylinder rod piston shaft actuates the release poke fork by engaging the release poke fork at a release poke fork rounded engagement.

10. The railway car slipping block brake lock of claim 7, further including a brake pipe air source port for receiving air pressure from the brake pipe, wherein a cylinder spring mounted to the cylinder rod piston shaft biases the cylinder rod piston shaft into a disengaged position until the air recharging valve actuates and increases air pressure in the functional cylinder.

11. The railway car slipping block brake lock of claim 10, wherein the cylinder rod piston shaft is sealed to the functional cylinder by an air cylinder lamina, wherein the air cylinder lamina is retained to a cylinder rod pressure plate of the cylinder rod piston shaft by an air cylinder lamina retainer.

12. The railway car slipping block brake lock of claim 11, further including an air recharging valve and an air discharging valve, wherein the air recharging valve when actuated increases air pressure in the functional cylinder, and wherein the air discharging valve when actuated decreases air pressure in the functional cylinder.

13. The railway car slipping block brake lock of claim 11, wherein a cylinder rod piston shaft actuates the release poke fork by engaging the release poke fork at a release poke fork rounded engagement.

14. The railway car slipping block brake lock of claim 13, further including an air recharging valve and an air discharging valve, wherein the air recharging valve when actuated increases air pressure in the functional cylinder, and wherein the air discharging valve when actuated decreases air pressure in the functional cylinder.

\* \* \* \* \*